United States Patent [19]

(12) United States Patent (10) Patent No.: US 8,804,035 B1
Casavant et al. (45) Date of Patent: Aug. 12, 2014

(54) METHOD AND SYSTEM FOR COMMUNICATING DESCRIPTIVE DATA IN A TELEVISION BROADCAST SYSTEM

(71) Applicant: The DIRECTV Group, Inc., El Segundo, CA (US)

(72) Inventors: Scott D. Casavant, Germantown, MD (US); Brian D. Jupin, Germantown, MD (US); Stephen P. Dulac, Santa Clarita, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 13/626,749

(22) Filed: Sep. 25, 2012

(51) Int. Cl.
*H04N 7/00* (2011.01)
*H04N 11/00* (2006.01)

(52) U.S. Cl.
USPC ........... 348/468; 348/467; 348/465; 348/464; 348/462; 348/461; 348/508; 348/639; 348/646; 348/651; 348/660; 348/720; 348/231.5; 704/209; 704/235; 704/260; 704/275; 725/18; 725/38; 725/91; 725/103; 725/114; 725/136; 725/137; 725/138; 725/144

(58) Field of Classification Search
USPC ......... 348/468, 467, 461, 465, 464, 462, 508; 348/639, 646, 651, 660, 720, 231.5; 704/260, 500, 209, 235, 275; 725/18, 725/38, 91, 103, 114, 137, 138, 144
See application file for complete search history.

(56) References Cited

U.S. PATENT DOCUMENTS

| 5,677,739 | A  | * | 10/1997 | Kirkland ........................ 348/468 |
| 5,938,447 | A  | * | 8/1999 | Kirksey ......................... 434/169 |
| 6,076,059 | A  | * | 6/2000 | Glickman et al. ............. 704/260 |
| 6,243,676 | B1 | * | 6/2001 | Witteman ...................... 704/243 |
| 7,047,191 | B2 | * | 5/2006 | Lange et al. .................. 704/235 |
| 7,149,690 | B2 | * | 12/2006 | August et al. ................. 704/270 |
| 7,245,664 | B1 | * | 7/2007 | Ohnami ................... 375/240.28 |
| 7,613,613 | B2 | * | 11/2009 | Fields et al. .................. 704/272 |
| 8,566,857 | B2 | * | 10/2013 | Putnam .......................... 725/22 |
| 2003/0028378 | A1 | * | 2/2003 | August et al. ................. 704/260 |
| 2003/0216922 | A1 | * | 11/2003 | Gonzales et al. ............. 704/260 |
| 2004/0151473 | A1 | * | 8/2004 | Itoh ................................ 386/83 |
| 2006/0008260 | A1 | * | 1/2006 | Chen et al. .................... 386/125 |
| 2006/0129400 | A1 | * | 6/2006 | Fields et al. .................. 704/260 |
| 2007/0118364 | A1 | * | 5/2007 | Wise et al. .................... 704/215 |
| 2007/0220544 | A1 | * | 9/2007 | Nash-Putnam ................ 725/32 |
| 2008/0117282 | A1 | * | 5/2008 | Cho ............................. 348/14.1 |
| 2009/0052519 | A1 | * | 2/2009 | Oh et al. ....................... 375/240 |
| 2009/0204404 | A1 | * | 8/2009 | Jarman et al. ................. 704/260 |
| 2010/0324894 | A1 | * | 12/2010 | Potkonjak ..................... 704/235 |
| 2011/0093276 | A1 | * | 4/2011 | Ramo et al. ................... 704/500 |
| 2011/0234900 | A1 | * | 9/2011 | Quan ............................ 348/468 |

* cited by examiner

*Primary Examiner* — Jefferey Harold
*Assistant Examiner* — Mustafizur Rahman

(57) ABSTRACT

A method and system for communicating text descriptive data has a receiving device that receives a data signal having text description data corresponding to a description of a video signal. A text-to-speech converter associated with the receiving device converts the text description data to a first audio signal. A display device in communication with the text-to-speech converter converts the first audio signal associated with the receiving device to an audible signal.

16 Claims, 4 Drawing Sheets

METHOD AND SYSTEM FOR COMMUNICATING DESCRIPTIVE DATA IN A TELEVISION BROADCAST SYSTEM

TECHNICAL FIELD

The present disclosure relates generally communicating content to a user device from a service provider, and, more specifically, to providing a descriptive data service associated with the broadcast video.

BACKGROUND

The statements in this section merely provide background information related to the present disclosure and may not constitute prior art.

Content providers are continually improving the ways content may be presented to users that are physically impaired. For example, for those who are hearing impaired, broadcasters provide closed-captioning that is displayed on the screen and present a box with words that correspond to spoken words on the audio track.

For visually impaired people, video descriptive services are sometimes employed in a video. Video-descriptive services provide a description of the action and characters associated with the video. An audio track is provided that provides the description. Some DVDs include the video-descriptive data because of the amount of space required to store the additional audio track. Should a broadcaster attempt to provide an additional audio track, a significant amount of space or bandwidth is required. It is estimated that an audio signal to provide video-descriptive service requires a bandwidth of about 64 kilobits per second. For a cable system or a satellite provider to provide a video-descriptive service for each channel carried may be cost-prohibitive and bandwidth-prohibitive.

SUMMARY

The present disclosure provides a system and method for reducing the amount of bandwidth required for providing a video-descriptive service.

In one aspect of the disclosure, a method includes generating a data signal comprising text description data corresponding to a description of a video signal, communicating the data signal to a receiving device, converting the text description data to a first audio signal and converting the first audio signal into a first audible signal at a display device associated with the receiving device.

In a further aspect of the disclosure, a system for communicating text descriptive data has a receiving device that receives a data signal having text description data corresponding to a description of a video signal. A text-to-speech converter associated with the receiving device converts the text description data to a first audio signal. A display device in communication with the text-to-speech converter converts the first audio signal associated with the receiving device to an audible signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
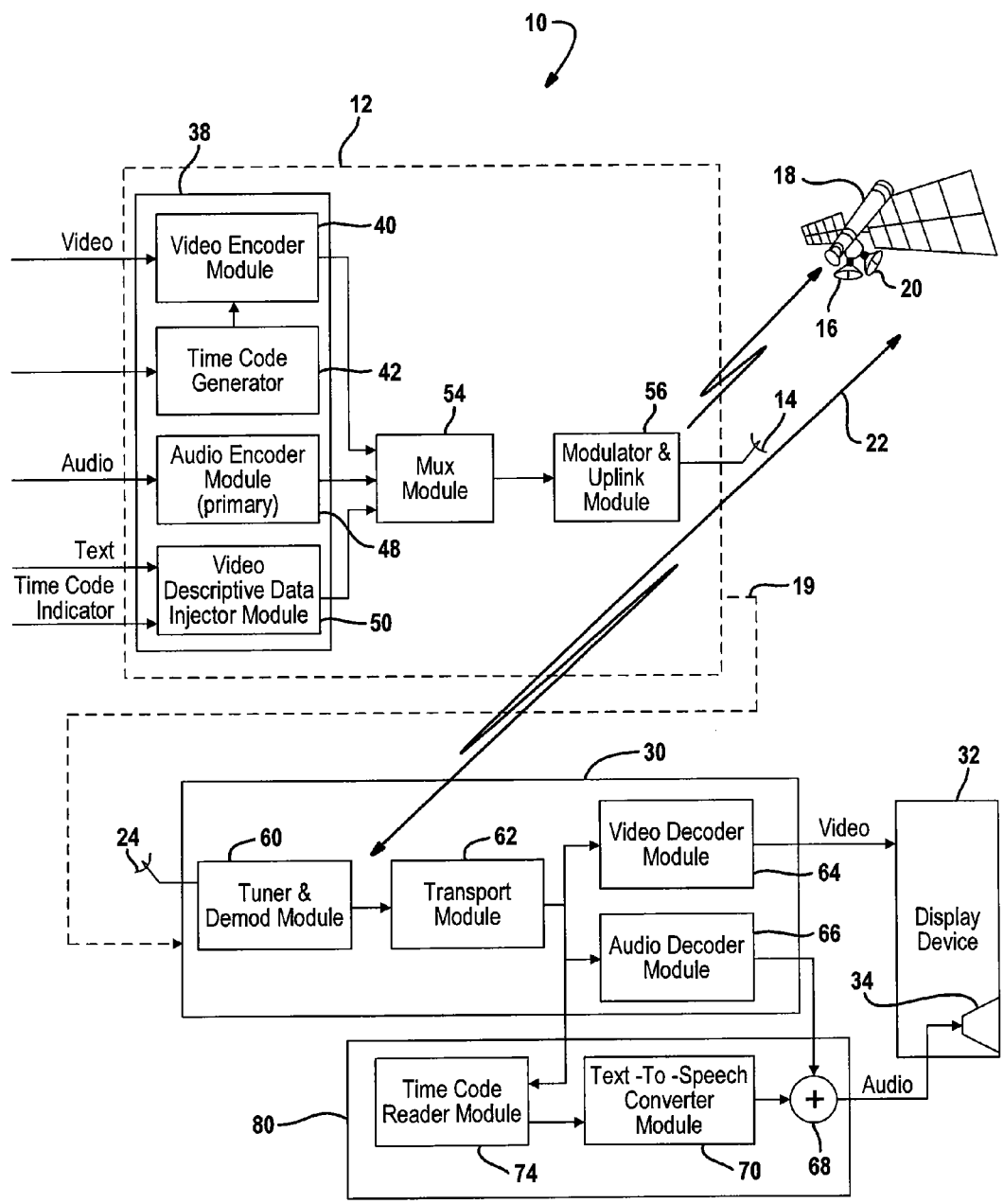
FIG. 1 is a block diagrammatic view of a first example according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Referring now to FIG. 1, a satellite television broadcasting system 10 is illustrated. The satellite television broadcasting system 10 includes a network operation center (NOC) or operational headend 12 through which a service provider generates wireless uplink signals through a transmitting antenna 14. The uplink signals are received by a receiving antenna 16 of a satellite 18. The satellite 18 is merely representative of a communication network. As mentioned above, the satellite 18 may be replaced by a terrestrial system 19 such as a cable system, telephone, or wireless distribution system. In this example, the wireless signals may be digital and in a format used for satellite communications. A transmitting antenna 20 generates wireless downlink signals directed to various receiving systems including those in a building such as a home, multiple-dwelling unit, hotel, or other type of commercial building.

The wireless signals may have various types of data associated with them including various channel information such as channel or program guide data, metadata, location information, and the like. The wireless signals may also include various video and audio signals. One example of a data signal is a closed-captioned signal. Another example of data is text description data which may also be referred to as video-descriptive services. The text description data will be described in further detail below. The wireless signals may include regularly scheduled programming, pay-per-view events and on-demand programming.

The satellite 18 and the transmitting antenna 20 associated therewith communicate downlink signals 22 to a receiving antenna 24 associated with a receiving device 30. The downlink signals 22 are received by the receiving antenna 24 and processed within the receiving device 30 so that they are displayed on a display device 32. The display device 32 may be, but is not limited to, a monitor, television, computer, tablet or phone. The display device 32 may have a speaker 34 associated therewith for generating audible signals therefrom. The speaker 34 may be integrated within or may be a separate device connected thereto. For example, the speaker may be an A/V sound system.

The headend 12 may include various components of which the relevant components for the present example are set forth. In this example, a processing module 38 includes a video encoder module 40 that is used to encode the video into a format suitable for satellite transmission. The video encoder module 40 may receive time code or have time code associated therewith from a time code generator 42. Each frame of the video may have a time code associated therewith. Typically, a certain number of frames corresponds to a second. Twenty-four frames, 25 frames and 30 frames are common frame rates. Typically, time code includes the frame identifier, the seconds and the minutes associated with each frame. In this example, the time code may be used to trigger an insertion of descriptive audio data. Other triggers may be used including a tone or video marker.

An audio encoder 48 may also be included within the processing module 38 of the headend 12. The audio encoder 48 encodes the audio into a suitable audio format such as AC3. Of course, other types of audio encoding may be used.

A video-descriptive data injector module 50 is used to provide textual data that corresponds to a description of the video. The video descriptive data injector module 50 may receive text description data from a source and a time code indicator corresponding to the time code of the video at which time the descriptive data is played out in an audio signal. Thus, both the text and time code indicator may be included in a video descriptive data injector signal (data signal).

A multiplexer module 54 is in communication with the processing module 38 and the video encoder module 40, the audio encoder module 48 and the video descriptive data injector module 50 therein. The encoded video signal, the encoded audio signal and the text description data signal are multiplexed in the multiplexing module 54 to form a multiplexed signal.

A modulator and uplink module 56 receive the multiplexed signal from the multiplexer module 54 and modulates and uplinks the multiplexed signal to the satellite 18. The multiplexed signal forms a channel signal. In another type of content delivery system such as a cable system, the modulator may modulate the signal through a cable and "uplinking" is not required.

The receiving device 30 may be a set top box or another type of receiving device such as a mobile device computer, or the like. A tuner and demodulator module 60 is used to tune to a particular channel signal and demodulate the signal. A forward-error correction module may also be included within the tuner and demodulator module 60. The tuner and demodulator module 60 is in communication with a transport module 62. The transport module 62 breaks the signal down into its component signal which in this example corresponds to an encoded video signal, an encoded audio signal and a text description data signal.

A video decoder 64 decodes the encoded video signal and communicates the unencoded video signal to the display device 32. An audio decoder 66 decodes the encoded audio signal and communicates the first audio signal to a summation module or multiplexer module 68. A text-to-speech converter module 70 receives the text description data signal and converts the text signal into a second audio signal. The second audio signal from the text-to-speech converter module 70 is also provided to the summation or multiplexer module 68.

The text-to-speech converter module 70 may be located within the receiving device 30 or as a separate component coupled to the receiving device. The summation module 68 may also be located within or outside the receiving device 30.

A time code reader module 74 is used to read the time code associated with the video decoder module. The time code reader module may provide an input to the text-to-speech converter module 70. The text-to-speech converter module 70 recognizes the time code and reads the time code trigger communicated within the text description data signal. At the time code corresponding with the time code trigger within the text description data signal, the second audio signal may be communicated to the summation module 68.

The text-to-speech converter module 70 and the summation module 68 may be a separate device assembly 80 coupled to the receiving device 30. The text-to-speech converter module 70 and the summation module 68 may also be incorporated into the circuitry of the receiving device 30.

Figure 2:
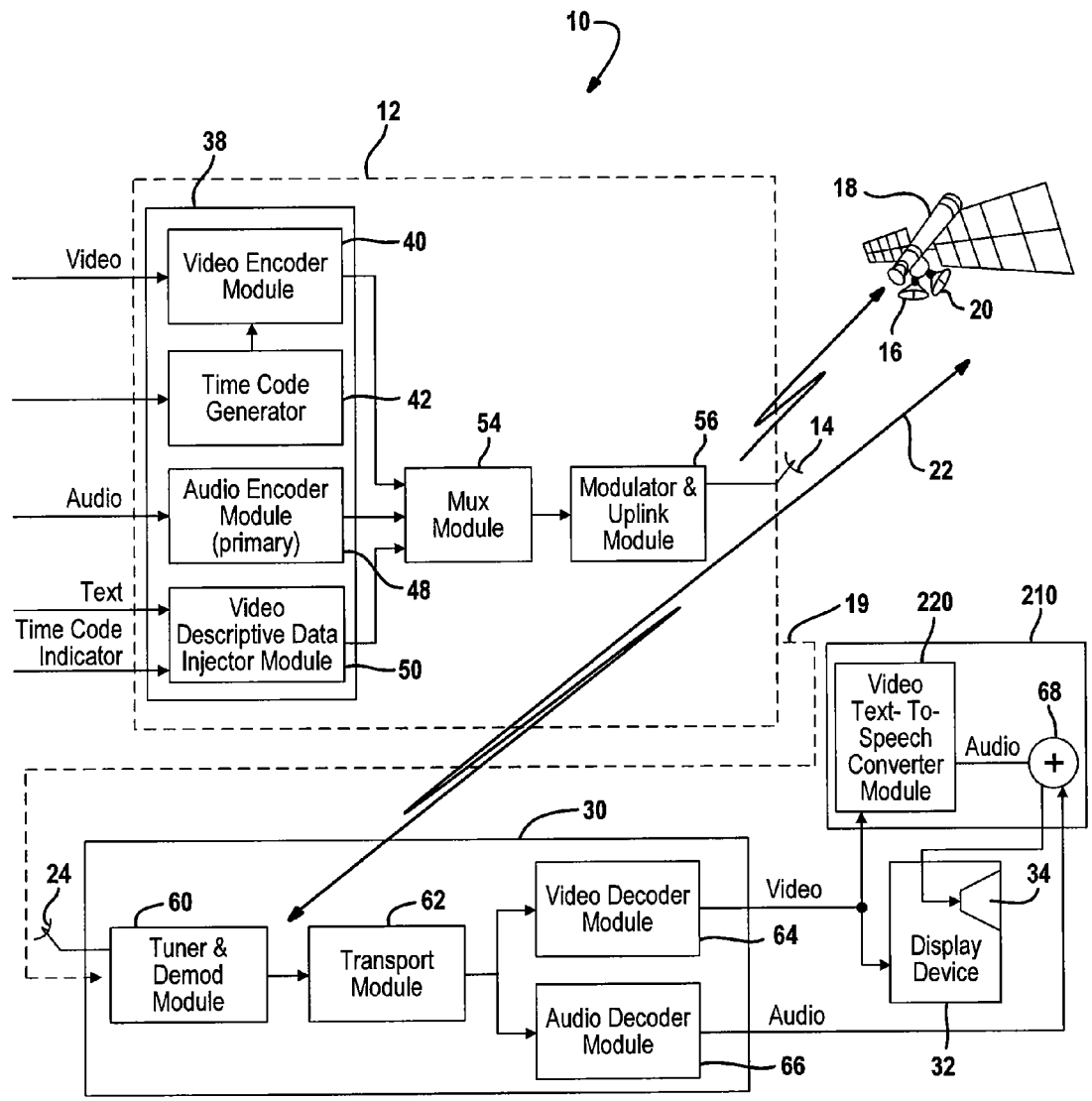
FIG. 2 is a block diagrammatic view of a second example according to the present disclosure.

Referring now to FIG. 2, a block diagrammatic view of a system that provides an alternative method for providing the text description data signal is set forth. In this example, a closed-caption processor 210 generates a closed-caption data stream that includes the text description data signal. The closed-caption processing module 210 is a known type of processing module that is used for a different purpose. In this case, the closed-caption processor module 210 provides text description data in the closed caption data which corresponds to a description of the video signal. The cost of providing such a system is reduced because of the use of a known processing module.

In this case, the video decoder module 64 provides a first video output to the display device 32 and a second video output to a video text-to-speech converter module 220. The video text-to-speech converter module 220 translates the text description data included with the closed-caption signal into an audio signal. The audio signal from the video text-to-speech module may be combined with the audio signal associated with the video at the summation module 68 and provided to the display device 32. The display device converts to combined signal into an audible signal.

It should be noted that text-to-speech processing may occur selectively. For example, text in a menu may be converted if set forth in a particular format such as color or presented in a colored box.

Figure 3:
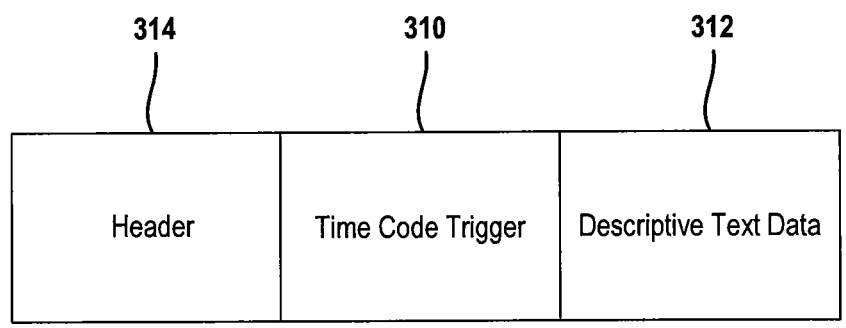
FIG. 3 is a representation of a text description data signal formed according to the present example.

Referring now to FIG. 3, a schematic view of the video descriptive data injection signal (data signal) is set forth. In this example, a time code trigger portion 310 generates the time code trigger at which time the second audio signal having the video description is to be added to the first audio signal. Text description data is illustrated as box 312. Further, a header 314 may also be provided that provides a description of the content to which the packet or content pertains (a material identifier or the like) or other packet identifiers. However, the header 314 may also be an optional portion since the multiplex signal contains the text description associated with the particular program content. The time code trigger 310 may also be optional if a triggering mechanism is not required.

Figure 4:
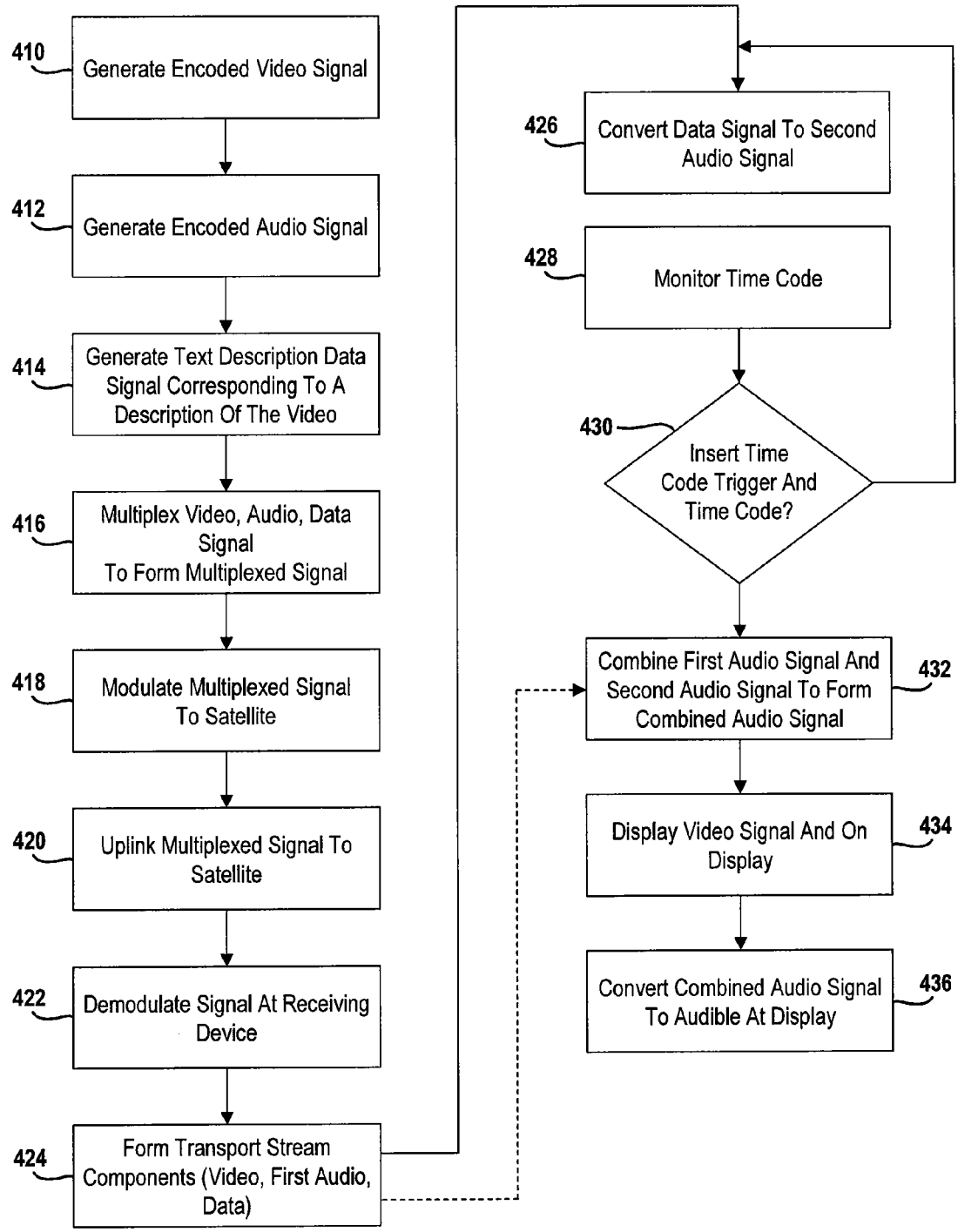
FIG. 4 is a flowchart of a method for operating the present disclosure.

Referring now to FIG. 4, the method set forth in the present example is ultimately used to generate a descriptive audible signal at a receiving device which is communicated in a data-efficient manner. In step 410, a video signal from a content source is encoded. The encoding may take place at the video encoder of the headend described above. The content signal may also include an audio signal that is encoded at the audio encoder of the headend.

In step 414, descriptive data corresponding to the video is generated or received at the processing module of the headend. The signal may be an audible signal that is converted to text or may originate as text. The text description data corresponds to a description of the video. The text description data may correspond to, but is not limited to, the actual physical surroundings of the characters, a description of the characters, and the actions of the characters within the program content.

In step 416, the encoded video signal, the encoded audio signal and the text description data signal are multiplexed to form a multiplexed signal. In step 418, the multiplexed signal is modulated into a modulated signal for transmission. The modulation is performed at a frequency suitable for the method of transmission. For example, a cable system may modulate the multiplexed signal at a different frequency than a terrestrial-based system. Different satellites may require different modulated frequencies. In step 420, the multiplexed signal is uplinked to a transmission means which is the satellite in the present example.

In step 422, the satellite transmits the signal to the receiving device which demodulates the signal to form a demodulated signal corresponding to the multiplexed signal from step 416. In step 424, the transport streams are formed from the demodulated signal. The transport streams correspond to the encoded video signal, the encoded audio signal and the data signal described above. In step 426, the data signal is converted to a second audio signal in the text-to-speech converter module of FIG. 1. An optional step of monitoring the time code associated with the video signal is performed by the video text-to-speech converter module. In step 430, a time code trigger is determined from the text signal. As illustrated in FIG. 3, the time code trigger may be transmitted with the data signal to provide a location for the insertion of the second audio signal during playback. Thus, when the time code trigger corresponds to the time code in the video signal in step 430, step 432 is performed. In step 432, the first audio signal and the second audio signal, which correspond to the descriptive data signal, are combined to form a combined audio signal.

In step 434, the video signal is displayed on the display associated with the receiving device. In step 436, the combined audio signal is played out at the display and is transmitted through the speakers of the display to form an audible signal. The audio signal corresponding to content is played together with the descriptive audio signal generated from the text. The time code allows the alignment of the text-descriptive audio signal to be minimally invasive and not interfere with the first audio signal of the content.

The use of the time code in steps 428 and 430 is an optional step. The timing may be adjusted based upon the speed of the transmission system or when the text is communicated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
communicating a video signal and a broadcast audio signal to a receiving device, said video signal comprising a time code associated therewith;
generating a digital data signal in digital packets that comprise a digital packet header portion, a time code trigger and a text descriptive portion that comprises text description data corresponding to a description of the video signal;
communicating the digital data signal to the receiving device;
converting the text description data to a first audio signal;
combining the first audio signal with the broadcast audio signal associated with the video signal to form a combined audio signal when a time code of the video signal corresponding to the trigger is reached;
converting the combined audio signal into a first audible signal at a display device associated with the receiving device.

2. The method as recited in claim 1 wherein generating a data signal comprises generating the data signal at a headend.

3. The method as recited in claim 1 further comprising converting the broadcast audio signal to an unencoded audio signal in an audio decoder of the receiving device.

4. The method as recited in claim 1 wherein communicating the data signal comprises multiplexing the data signal, the video signal and the broadcast audio signal to form a multiplexed signal and communicating the multiplexed signal to the receiving device.

5. The method as recited in claim 1 wherein communicating the text description data comprises communicating the data signal, the video signal and the first audio signal to the receiving device through a satellite.

6. The method as recited in claim 5 wherein converting the text description data to the first audio signal comprises converting the text description data to the first audio signal in a speech-to-text converter coupled to the receiving device.

7. The method as recited in claim 1 further comprising communicating closed caption data to the receiving device in a first closed caption data stream and wherein communicating text description data comprises communicating text description data in a second closed caption data stream.

8. A system comprising:
 a receiving device receiving a video signal and a broadcast audio signal, said video signal comprising a time dode associated therewith;
 said receiving device receiving a digital data signal having a digital packet header portion, a time code trigger and a descriptive text portion, said descriptive text portion comprising text description data corresponding to a description of the video signal;
 a text-to-speech converter associated with the receiving device converting the descriptive text portion to a first audio signal;
 a summation module combining the first audio signal with the broadcast audio signal at the time code corresponding to the time code trigger to form a combined audio signal; and
 a display device in communication with the summation module converting the combined audio signal to an audible signal.

9. The system as recited in claim 8 further comprising a time code reader reading the time code associated with the video signal.

10. The system as recited in claim 9 further comprising a headend communicating the text description data to the receiving device.

11. The system as recited in claim 10 wherein the headend generates the descriptive text portion.

12. The system as recited in claim 10 wherein the headend comprises a multiplexer multiplexing the descriptive text portion, a video signal and the broadcast audio signal to form a multiplexed signal, said headend communicating the multiplexed signal to the receiving device.

13. The system as recited in claim 10 wherein the headend communicates the descriptive text portion to the receiving device in a closed caption data stream.

14. The system as recited in claim 8 further comprising a satellite communicating the data signal with the descriptive text portion, the video signal and the first audio signal to the receiving device.

15. The system as recited in claim 8 wherein the text-to-speech converter is separate from and coupled to the receiving device.

16. The system as recited in claim 8 wherein the receiving device comprises the text-to-speech converter.

\* \* \* \* \*